United States Patent [19]

Kordomenos

[11] Patent Number: 4,504,606

[45] Date of Patent: Mar. 12, 1985

[54] THERMOSETTING COATING COMPOSITION—I

[75] Inventor: Panagiotis I. Kordomenos, Mt. Clemens, Mich.

[73] Assignee: Ford Motor Company, Dearborn, Mich.

[21] Appl. No.: 565,800

[22] Filed: Dec. 27, 1983

[51] Int. Cl.$^3$ ............ C08L 61/32; C08L 63/02; C09D 3/52; C09D 3/58

[52] U.S. Cl. .................. 523/400; 525/510; 525/514; 528/45; 528/73; 528/104; 528/110

[58] Field of Search ............... 523/400; 528/45, 73, 528/110, 104; 525/514, 510

[56] References Cited

U.S. PATENT DOCUMENTS

| | | | |
|---|---|---|---|
| 3,843,594 | 10/1974 | Labana et al. | 523/400 |
| 4,036,795 | 7/1977 | Tominaga | 528/45 |
| 4,151,305 | 4/1979 | Davis et al. | 525/514 |
| 4,196,270 | 4/1980 | Chattha | 523/400 |
| 4,322,508 | 3/1982 | Peng et al. | 525/110 |
| 4,338,423 | 7/1982 | Holubka | 525/510 |
| 4,339,369 | 7/1982 | Hicks et al. | 528/104 |
| 4,374,213 | 2/1983 | Dickie et al. | 525/510 |
| 4,396,753 | 8/1983 | Holubka | 523/400 |
| 4,423,171 | 12/1983 | Holubka | 523/400 |

Primary Examiner—Ronald W. Griffin
Attorney, Agent, or Firm—Peter D. McDermott; Roger L. May

[57] ABSTRACT

Novel solvent-based thermosetting composition comprising (a) hydroxy functional epoxy ester resin of number average molecular weight (Mn) between about 1,000 and about 5,000, comprising the reaction product of diepoxide with diphenol and acid component comprising hyroxy functional acid and optionally further comprising fatty acid; and (b) polyfunctional, hydroxy-reactive crosslinking agent, for example, aminoplast crosslinking agent or blocked polyisocyanate crosslinking agent comprising isocyanate groups blocked by reaction with an active hydrogen bearing blocking agent. Coating composition may be formulated as primer sprayable with conventional spraying equipment.

22 Claims, No Drawings

THERMOSETTING COATING COMPOSITION—I

TECHNICAL FIELD

This invention relates to a novel, solvent-based, thermosetting epoxy ester coating composition. It relates also to such coating composition formulated, for example, as sprayable coating composition suitable for use as an automotive vehicle primer to make coatings which are highly resistant to corrosion, humidity and solvents.

BACKGROUND

Solvent-based coating compositions are known which can be applied to a substrate, for example, by spraying, and then cured by baking the coated substrate at an elevated temperature suitable to drive off the organic solvent and to promote crosslinking reaction. The resulting thermoset coating, if sufficiently humidity and solvent resistant, can provide aesthetic and functional advantages including corrosion protection for the underlying substrate.

It is an object of the present invention to provide solvent-based thermosetting coating compositions comprising hydroxy functional epoxy ester resins which are crosslinkable during cure, on the surface of a substrate. It is another object of the invention to provide a method of making a coating on a substrate, which coating provides advantageous physical properties including, for example, humidity and solvent resistance and corrosion protection for the underlying substrate. Additional aspects and advantages of the invention will be apparent from the following description thereof.

DISCLOSURE OF THE INVENTION

According to the present invention, a novel organic solvent based coating composition, in addition to solvent and any pigments and additives such as, for example, catalyst, flow control agents and the like, comprises:

(A) crosslinkable hydroxy functional epoxy ester resin preferably having a number average molecular weight (Mn) between about 1,000 and about 4,000 and comprising the reaction product of diepoxide chain extended with diphenol and either subsequently or simultaneously chain terminated with acid component comprising hydroxy functional acid; and (B) polyfunctional, hydroxy-reactive crosslinking agent selected preferably from aminoplast crosslinking agent such as, for example, hexamethoxymethyl melamine, and blocked polyisocyanate crosslinking agent including, but not limited to, blocked trifunctional isocyanurate ring containing polyisocyanates and oligoester modified blocked isocyanates, or a compatible mixture of any of them.

Particularly preferred compositions of the invention are those adapted to be applied by spraying onto a substrate. Such compositions are especially useful as a primer coat on the bare, unpolished metal surface of an automotive vehicle body panel.

According to another aspect of the invention, a method of making a corrosion, solvent and humidity resistant coating on a substrate comprises applying to the substrate the solvent based thermosetting coating composition of the invention and subsequently subjecting the coating to an elevated temperature for a time period sufficient to substantially cure the coating layer. Typically, the novel coating compositions of the invention can be cured by heating to between about 240° F. and about 400° F., for a time period sufficient to yield a cured coating, for example for about 10 to about 60 minutes. According to preferred embodiments of the invention, the coating composition can be sufficently cured for good coating properties by heating to about 240° F. for about 20 minutes but, in addition, such preferred composition will tolerate curing at up to about 400° F. for as much as about 60 minutes without substantial loss of such advantageous coating properties.

The coating compositions of the present invention provide cure-response advantages without sacrifice of advantageous physical properties in the cured coating. That is, when applied, for example, over a metallic substrate, such as when applied as an automotive vehicle primer coat over sheet steel, cured coatings according to the invention have been found to provide excellent adhesion to the substrate, excellent humidity resistance, and excellent corrosion resistance.

Preferred compositions of the invention include significant aromatic content which is believed to enhance corrosion resistance properties. It is now believed that aromatics in a coating composition, such as a primer composition for a metal substrate, are more resistant to hydrolysis than are aliphatics. Accordingly, while not wishing to be bound by theory, it is presently believed that the high aromatic content of the epoxy ester resin employed in the compositions of the invention explains in part the exceptional corrosion protection found to be provided by same used as primers on ferrous metal substrates. This is especially the case, for example, according to preferred embodiments where the diepoxide reactant as well as the diphenol reactant provides aromatic units to the resin. In addition, it is presently understood that the phenolic oxygens introduced into the epoxy ester resin by the chain extension reaction of diphenol with diepoxy advantageously provide excellent adhesion to metal substrate, for example steel substrate. The high aromatic content of the cured coating and its excellent adhesion are seen each to enhance the advantegee provided by the other, to yield the abovementioned exceptional corrosion protection of the cured coatings of the invention.

Other features and advantages of this invention will become more apparent from the following, detailed description thereof including the preferred embodiments and the best mode of carrying out this invention.

DETAILED DESCRIPTION OF THE INVENTION

The hydroxy functional epoxy ester resin employed in the composition of the present invention preferably has a number average molecular weight (Mn) of between about 1,000 and about 5,000. More preferably, especially for use in sprayable coating compositions of higher solids content, the epoxy ester resin has a number average molecular weight (Mn) of between about 1000 and about 3000. The hydroxy functional epoxy ester resin is formed by reacting diepoxide with diphenol to yield a diepoxide functional chain-extension reaction product and either simultaneously or subsequently reacting such diepoxide reaction product preferably in approximately 1 to 1 equivalent ratio with acid component comprising primary hydroxy functional acid in chain terminating reaction.

Thermosetting compositions of the invention comprise such epoxy ester resin and polyfunctional hydroxy-reactive crosslinking agent selected, preferably, from aminoplast crosslinking agent, blocked polyisocyanate crosslinking agent comprising at least two isocyanate groups blocked by reaction with an active hydrogen bearing blocking agent. The polyfunctional crosslinking agent is included in the composition in an amount sufficient to provide between about 0.5 and about 1.6 reactive groups per hydroxy functionality of the epoxy ester resin.

Each of the above major components of the compositions as well as optional components and other aspects of the invention are described hereinafter in greater detail.

A. Epoxy Ester Resin

As described above, the hydroxy functional epoxy ester resin is formed by reacting diepoxide with diphenol in chain extension reaction and with acid component comprising primary hydroxy functional acid in chain terminating reaction.

(i) Diepoxide Reactant

The diepoxide reactant suitable for preparing the hydroxy functional epoxy ester resin can be any of numerous diepoxides including many which are commercially available and which will be apparent to the skilled of the art in view of the present disclosure. While, ultimately, the choice of diepoxide reactant for preparing the hydroxy functional epoxy ester resin will depend to an extent upon the particular application intended for the final coating composition, terminal diepoxides, that is diepoxides bearing two terminal epoxide groups, are generally most preferred. These are generally more reactive and therefore require milder reaction conditions under which undesirable side reactions, for example, epoxy-epoxy reactions and gelation, can be more easily avoided.

Preferably, the diepoxide has a number average molecular weight ($M_n$) between about 100 and about 1000, and more preferably between about 100 and about 600.

Suitable diepoxide reactants include, for example, bisphenol-A epichlorohydrin epoxy resins such as the Epon (trademark) series, Shell Chemical Company, Houston, Tex., and the DER (trademark) series, Dow Chemical Company, Midland, Mich. These diglycidyl ether bisphenol-A resins and higher molecular weight analogs thereof, are preferred in view of their low cost and commercial availability.

Also suitable are cycloaliphatic diepoxy resins such as, for example, the Eponex (trademark) series, Shell Chemical Company, Houston, Tex.; hydantoin epoxy resins such as, for example, Resin XB2793 (trademark), Ciba-Geigy Corporation, Ardsley, N.Y.; and any of a wide variety of acyclic or cyclic aliphatic diepoxides such as, for example, 1.4-butanediol diglycidyl ether and 4-vinylcyclohexene dioxide and the like. Other suitable diepoxides, are commercially available or are readily prepared by those skilled in the art and will be apparent to the skilled of the art in view of the present disclosure. Also, it will be understood from the foregoing that any mixture of compatible diepoxides may be used.

In addition to the diepoxide, a portion of the epoxy functionality can be provided by any compatible monoepoxy compound or polyepoxy compound or mixture of such compounds. Suitable polyepoxides include, for example, those of molecular weight about 200 to about 800. The polyepoxide can be any of the well known types such as polyglycidyl ethers of polyphenols. These can be produced by etherification of polyphenol with epihalohydrin in the presence of alkali. It will be recognized by the skilled of the art in view of the present disclosure, that in some instances, particularly where a coating composition of high solids content is less important, it may be desirable to incorporate polyepoxide of higher molecular weight. Preferably, any such polyepoxide contains free hydroxyl groups in addition to epoxide groups.

While polyglycidyl ethers of polyphenol can be employed, it may be desirable to react a portion of the reactive sites (hydroxyl or in some instances epoxy) with a modifying material to vary the film characteristics of the resin. The epoxy resin may be modified, for example, with isocyanate group containing organic materials or other reactive organic materials.

Other useful polyepoxides are the novolak resins including, for example, the novolak epoxy resins ECN 1235 (trademark) and ECN 1273 (trademark), Ciba-Geigy Corporation.

According to preferred embodiments of the present invention, epoxide compounds other than diepoxide compounds provide no more than about 15% and most preferably substantially none of the total epoxide functionality in the reactants used to form the epoxy-ester resin.

(ii) Diphenol Reactant

The diphenol reactants suitable for reaction with the diepoxide reactant in chain extension reaction include numerous commercially available materials, many of which will be readily apparent to the skilled of the art in view of the present disclosure. Preferred diphenols have the general formula (I);

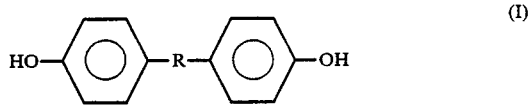

wherein R is a divalent linking moiety substantially unreactive with the diepoxide resin. Preferably R is a divalent organic linking moiety, for example, C=O, (CH$_2$)$_n$ wherein n is preferably from 1 to about 8, and the like, although inorganic moieties, for example sulfonyl and the like, also are suitable. Diphenols of this character have been found to provide good reactivity with diepoxides described above and to provide, ultimately, cured coatings of the invention having excellent physical properties, most notably excellent corrosion protection. It will be apparent to the skilled of the art in view of the present disclosure that R should be substantially unreactive with the diepoxide and the acid component employed in preparation of the epoxy ester resin. Particularly preferred diphenols include those according to formula (I) above, wherein R is selected from the group consisting of a straight or branched alkylene or alkylidene moiety of one to about 10 carbons, preferably having three to four carbons and most preferably having the general formula (II):

wherein R' and R" are the same or different and each is a monovalent organic moiety preferably selected from the group consisting of hydrogen and lower alkyl of one to about four carbons, most preferably one to two carbons, and the like or a mixture of any of them. Preferably the diphenol has a number average molecular weight (Mn) between about 180 and about 500, more preferably between about 180 and about 250. Such diphenols include, for example bisphenol-A, which is most preferred, bisphenol-B and the like and a compatible mixture of any of them. As used herein the term diphenol may include, for example, compounds comprising a single dihydroxy substituted phenyl ring such as benzenediol. More preferred, however, are those diphenols providing two terminal, monohydroxy substituted phenyl rings such as in formula (I), above. Other examples of diphenols are bis-(4-hydroxytertutylphenyl)-2,2-propane, bis-(2-hydroxynapthylmethane and 1,5-dihydroxynaphthalene. Other suitable diphenols for the epoxy ester resin of the present invention will be apparent to the skilled of the art in view of the present disclosure.

(iii) Acid Component Reactant

Numerous suitable hydroxy functional acids will be apparent to the skilled of the art in view of the present disclosure, including many which are readily commercially available. These include $C_3$-$C_{26}$ hydroxy functional acids, wherein the acid contains one carboxyl group and one or more hydroxyl groups and no other functional groups which would substantially interfere with the preparation of the epoxy ester resin, i.e., which would be substantially unreactive with the chain-extension reactants described above and with the chain extension reaction product. Preferred hydroxy functional acids are primary hydroxy functional acids corresponding to the general chemical formula:

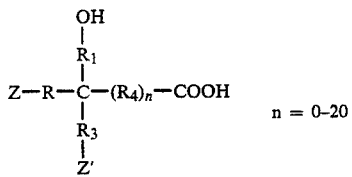

$n = 0-20$ wherein $R_1$, $R_2$, $R_3$ and $R_4$ are the same or different and each preferably is lower alkylene such as methylene and ethylene and Z and Z' are selected independently from hydrogen, hydroxyl, and any other non-interfering functionality such as nitrile ester group, halogen, amide, etc. Suitable hydroxy acids which may be employed in the chain terminating reaction include, but are not limited to, dimethylol propionic acid which is most preferred, bis(hydroxy ethyl) propionic acid, bis(hydroxy propyl) propionic acid, and the like and a compatible mixture of any of them. Preferably, the hydroxy acid contains two or more hydroxyl groups, i.e., at least one of Z and Z' contains a hydroxyl group.

Optionally, the acid component may further comprise fatty acid. Suitable fatty acids include numerous commercially available fatty acids such as, for example, those derived from or contained in either animal or vegetable fat or oil. Preferred are fatty acids from about 8 to about 18 carbons, since these are found to provide flexibility to the cured coating. Also preferred among the fatty acids are the more saturated fatty acids, since it appears that olefinic unsaturation in the fatty acid can undergo a polymerization-type reaction between such double bonds during the synthesis of the epoxy ester resin of the invention. Unsaturated fatty acids are suitable for use, however, such as, for example, oleic acid, linoleic, linolenic or the like and mixtures of those acids, and can be used together with a suitable inhibitor for the polymerization-type reaction such as hydroquinone or the like, of which many are commercially available and will be apparent to the skilled of the art in view of the present disclosure. In addition, aromatic fatty acids are commercially available and can be employed. Preferred for use are the substantially saturated fatty acids such as Soya fatty acid which is most preferred, and butyric, lauric, palmitic and stearic fatty acids and the like or a compatible mixture of any of them. These are relatively inexpensive and have been found to provide good reactivity with the preferred diepoxides described above. For convenience of use, the fatty acids which are semisolid or liquid at room temperature are generally preferred over the solid fatty acids.

The hydroxy functional epoxy ester resin used in the composition of the present invention can be made according to techniques well known to the skilled of the art. The chain termination reaction occurs either simultaneously with the chain extension of the diepoxide with diphenol or occurs subsequent thereto. If the reactions are carried out sequentially, diepoxide and diphenol are charged into a suitable reactor and heated. The reactants are used in relative proportions to yield a chain extension reaction product bearing two unreacted epoxy groups and preferably substantially no unreacted phenol functionality. Suitable separation techniques are known to the skilled of the art for removal of unused reactants. It should be recognized that to assure rapid and/or more complete reaction, it may be preferred to employ a reaction catalyst. The use of catalyst is found to provide epoxy ester resin which yields coating compositions of advantageous physical properties. Suitable catalysts are commercially available and include any of the well known catalysts for epoxy-phenol reactions such as, for example, sodium carbonate which is preferred, lithium neodecanoate and tertiary amine, and other organo metallic catalysts. Other suitable catalysts will be apparent to the skilled of the art in view of the present disclosure. After completion of the chain extension reaction of diepoxide with diphenol, the diepoxide reaction product is reacted with the acid component in chain terminating reaction in approximately 1 to 1 equivalent ratio. This ratio is preferred, since excess epoxy could result in gelation of the reaction mixture.

If the reactions are carried out simultaneously, the reactants are used in amounts suitable to yield the desired reaction ratio in view of the relative reactivity of the diphenol and the hydroxy functional acid, and in view of the desired molecular weight range for the reaction product.

B. Crosslinking Agent

The crosslinking agent employed in the novel solvent based coating compositions of the invention comprises polyfunctional, hydroxy-reactive crosslinking agent selected, preferably, from aminoplast crosslinking agents and blocked polyisocyanate crosslinking agents.

(a) Blocked Polyisocyanate Crosslinking Agent

Those embodiments of the novel solvent based coating compositions of the invention employing blocked polyisocyanate crosslinking agents exhibit exceptional shelf stability even when corrosion inhibiting pigments such as zinc chromate are used in high concentrations.

As used herein "blocked polyisocyanate" means an isocyanate compound containing two or more isocyanato groups, each of which has been reacted with a blocking agent which will prevent reaction of the isocyanate group at room temperature with compounds that conventionally react with such groups, and at least some of which will permit that reaction to occur at higher (cure) temperatures. In general, the blocked polyisocyanate may be prepared by reacting a sufficient quantity of an active hydrogen containing blocking agent with the polyisocyanate to insure that substantially no free isocyanato groups are present. The blocking agent may be represented by the formula BH and may be selected from numerous materials, hereinafter discussed, which bear an active hydrogen.

The proper proportion of blocked polyisocyanate crosslinking agent to hydroxy functional epoxy ester resin will depend, in part, upon the properties desired in the coating to be produced and, in part, upon the desired cure response of the coating composition (which will depend, in turn, upon the baking schedule to be used in curing the coating composition) and, in part, upon the desired storage stability of the composition, that is, upon the desired shelf life. Accordingly, the amounts of crosslinker that can be used with the epoxy ester resin varies considerably. Preferably the blocked polyisocyanate crosslinking agent is included in compositions of the invention in amounts such that upon deblocking of the blocked isocyanato groups at the cure temperature of the composition, the crosslinking agent will provide between about 0.5 and about 1.6, preferably between about 0.8 and about 1.3, reactive isocyanato groups per reactive group on the film forming resin of the coating composition as described above. Blocked polyisocyanates of numerous types may be employed in the compositions of the invention. Particularly suitable blocked polyisocyanates, which will be discussed further hereinafter, include blocked polymethylene polyphenol isocyanates, isocyanurate ring containing blocked polyisocyanates and certain oligoester modified blocked polyisocyanates.

In the preparation of the blocked polyisocyanate crosslinking agent, any suitable organic polyisocyanate may be used. Representative examples include the aliphatic compounds such as trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene, and 1,4-naphthalene diisocyanates, the aliphatic-aromatic compounds such as 4,4'-diphenylene methane, 2,4- or 2,6-tolylene, or mixtures thereof, 4,4'-toluidine, and 1,4-xylylene diisocyanates; substituted aromatic compounds such as dianisidine diisocyanate, 4,4'-diphenylether diisocyanate and chlorodiphenylene diisocyanate; the triisocyanates such as triphenyl methane-4,4'4"-triisocyanate, 1,3,5-triisocyanate benzene and 2,4,6-triisocyanate toluene; the tetraisocyanates such as 4,4'-diphenyl-dimethyl methane-2,2',5,5'-tetraisocyanate; and the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate terminated prepolymers. The polyols may be simple polyols such as glycols, e.g., ethylene glycol and propylene glycol, as well as other polyols such as glycerol; tri-methylolpropane. pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Examples of polyethers include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

A particular class of aromatic polyisocyanates which may be employed in the novel solvent based coating compositions of the invention are polymethylene polyphenol isocyanates having the formula:

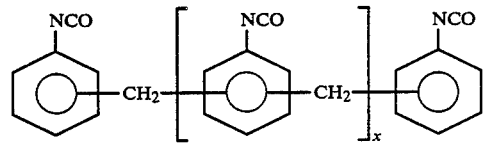

wherein x equals 1 to 3. The compounds, sold under the tradename "PAPI" by the Upjohn Chemical Company of Kalamazoo, Mich., are particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Preferred blocking agents include, for example, those selected from the group consisting of (i) aliphatic, cycloaliphatic and aromatic alkyl monoalcohols; (ii) hydroxyl amines; (iii) oximes; (iv) lactams; and (v) triazoles. Any suitable aliphatic, cycloaliphatic or aromatic alkyl monoalcohol may be used as a blocking agent in accordance with the present invention. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be employed. Suitable cycloaliphatic alcohols include, for example, cyclopentanol, cyclohexanol and the like, while aromatic-alkyl alcohols include phenylcarbinol, methylphenylcarbinol, and the like. Minor amounts of even higher molecular weight relatively non-volatile monoalcohols may be used, if desired, to serve as plasticizers in the coatings provided by the invention. Examples of hydroxyl amines which may be employed as blocking agents include ethanol amine and propanol amine. Suitable oxime blocking agents include, for example, methylethylketone oxime, acetone oxime and cyclohexanone oxime. Examples of lactams which may be used as blocking agents are ε-caprolactam, γ-butyrolactam and pyrrolidone, while suitable triazoles include compounds such as 1,2,4-triazole, 1,2,3-benzotriazole, 1,2,3-tolyl triazole and 4,5-diphenyl-1,2,3-triazole. Particularly preferred active hydrogen containing blocking agents are methylethyl ketoxime and 2-ethylhexanol.

(i) Isocyanurate Ring Containing Blocked Isocyanate Compounds

Within the scope of the above general class of blocked polyisocyanate crosslinking agents, a particular class or type of blocked polyisocyanate crosslinking agent which may be employed in the novel solvent based coating compositions of the invention comprises isocyanurate ring containing blocked isocyanate compounds. In general, these blocked polyisocyanates may be formed by blocking with the aforementioned blocking agents. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particularly desirable blocked polyisocyanate crosslinking agent is the blocked form of the pure trifunctional isocyanurate represented by the following formula:

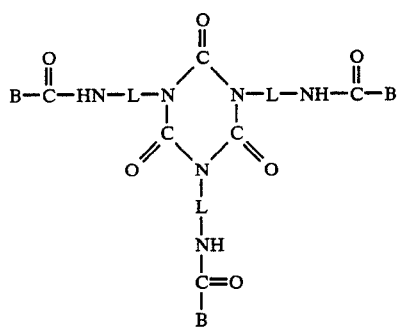

wherein each L is selected independently from the group consisting of aliphatic, cycloaliphatic and aromatic groups and combinations thereof and B is the residue of an active hydrogen containing blocking agent. More specifically, this compound is disclosed in U.S. patent application Ser. No. 368,178 filed Apr. 14, 1982, the disclosure of which is hereby incorporated by reference.

(ii) Oligoester Modified Blocked Polyisocyanates

Still further particular blocked polyisocyanates useful as crosslinking agents in the novel solvent based coating compositions of this invention are oligoester modified blocked polyisocyanates prepared from a particular class of oligoester diols and triols. A first type of such oligoester modified blocked polyisocyanate is prepared from organic diisocyanates wherein one isocyanato group is more reactive than the other, with the more reactive isocyanato first being blocked with a blocking agent and the remaining isocyanato group then being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanato terminated prepolymer followed by blocking of the terminal isocyanato groups of the prepolymer with an active hydrogen containing blocking agent. Each of these materials is particularly useful in the compositions of the invention and produces final cured coating compositions exhibiting outstanding flexibility.

Oligoesters of the type employed in the preparation of these crosslinking agents are described in U.S. Pat. No. 4,322,508 issued Mar. 30, 1982, the disclosure of which is hereby incorporated by reference. The hydroxy functional oligoesters within the useful class of materials (i) have a number average molecular weight (Mn) between about 150 and about 3000, preferably between about 230 and about 1000, (ii) bear 2 or 3 hydroxyl groups per molecule, and (iii) are formed by an esterification reaction between a carboxylic acid and an epoxide. The esterification reaction products are selected from the group consisting of:

(a) the esterification reaction product of polycarboxylic acid, i.e., carboxylic acid bearing 2 or more carboxyl groups, and monoepoxide:

(b) the esterification reaction product of polyepoxide, i.e., a compound having 2 or more epoxide groups, and monocarboxylic acid, preferably containing no ethylenic unsaturation, and bearing no hydroxy functionality;

(c) the esterification reaction product of hydroxy functional carboxylic acid and mono- or polyepoxide, preferably monoepoxide;

(d) the esterification reaction product of monocarboxyic acid and hydroxy functional mono- or polyepoxide, preferably monoepoxide; and (e) mixtures of (a)–(d).

As noted above, the first type of oligoester modified blocked polyisocyanate crosslinking agent is prepared by (i) reacting organic diisocyanate bearing one isocyanato group which is more reactive than the other with a sufficient amount of an active hydrogen containing blocking agent to react substantially with all of the more reactive isocyanate groups, thus providing a half-blocked diisocyanate and (ii) reacting this half-blocked intermediate with the above discussed oligoester. The organic diisocyanates employed in this synthesis, as well as the active hydrogen containing blocking agents, are discussed above in connection with the preparation of the isocyanurate ring containing blocked isocyanate crosslinking agents useful in compositions of the invention. The organic polyisocyanate-blocking agent adduct intermediate is formed by reacting a sufficient quantity of the blocking agent with the organic diisocyanate to insure that one of the two —NCO groups on the diisocyanate is reacted. The reaction between the organic diisocyanate and the blocking agent is exothermic and the diisocyanate and the blocking agent are preferably admixed at temperatures no higher than about 80° C., preferably below about 50° C., to minimize the exothermic effect.

The diisocyanate/blocking agent intermediate is next reacted with the oligoester diol or triol described above so as to react substantially all free or unblocked isocyanato groups of the intermediate with hydroxyl groups of the oligoester. This reaction is carried out desirably at a temperature of about 80°–120° C.

As also discussed above, the second type of oligoester modified blocked polyisocyanate crosslinking agent useful in the novel solvent based coating compositions of the invention is prepared by reacting an excess of organic diisocyanate with an oligoester diol from the above described class of oligoesters followed by reaction of the terminal isocyanato groups formed on the resultant prepolymer with an active hydrogen containing blocking agent as described above so as to react with substantially all the isocyanato groups. The diisocyanate starting material is used in excess in amounts sufficient to insure that the intermediate is isocyanate terminated. Therefore, it is preferable that the organic diisocyanates and the dihydroxy functional oligoester be reacted in a molar ratio of from greater than 1:1 up to 2:1. Numerous diisocyanates of the type described hereinbefore may be employed in the preparation of this intermediate. While it is not necessary that one isocyanato group be more reactive than the other, the preparation of this type of crosslinking agent does not preclude the use of such material.

(b) Aminoplast Crosslinking Agent

According to alternative embodiment of the invention, the novel solvent based coating compositions employ hydroxy-reactive polyfunctional aminoplast crosslinking agents. It will be recognized that compatible combinations of suitable polyfunctional aminoplast crosslinking agent(s) and blocked polyisocyanate crosslinking agent(s) also can be used. Included within the aminoplast crosslinking agents suitable for use in the coating composition are numerous materials which are well known to the skilled of the art including, for example, alkylated melamine formaldehyde resins with one to about eight carbon atoms in the alkyl moiety. Other suitable aminoplast crosslinking agents will be apparent to the skilled of the art in view of the present disclosure. Many such crosslinking agents are readily commercially available including, for example, the Resimene (trademark) series, Monsanto Company, St. Louis, Mo., the most preferred being Resimene 717 (trademark), described as a low temperature cure methylated melamine-formaldehyde resin.

In addition, suitable polyfunctional aminoplast crosslinking agents can be prepared employing conventional techniques. Accordingly, for example, a lower alkanol such as methanol, ethanol, butanol, isobutanol, isopropanol, hexanol, 2-ethylhexanol or the like or a mixture of any of them is reacted with a melamine formaldehyde. Preferred crosslinking agents of this type include butylated melamine formaldehyde resin, methylated/butylated formaldehyde resin and polyalkyl hexamethoxymethyl melamine resin which is most preferred in view of its relatively lower cost, ready commercial availability, and its low reactivity with the hydroxy functional epoxy ester resin of the invention at non-elevated temperatures. In this regard, preferred polyfunctional aminoplast crosslinking agent is substantially unreactive with the epoxy ester resin at or below about 60° C. Other suitable aminoplast crosslinking agents will be apparent to the skilled of the art in view of the present disclosure.

The proper proportion of polyfunctional aminoplast crosslinking agent to epoxy ester resin will depend, in part, upon the properties desired in the coating to be produced and, in part, upon the desired cure response of the coating composition (which will depend, in turn, upon the baking schedule intended for curing the coating composition) and, in part, upon the desired storage stability of the coating composition, that is, upon the desired shelf life. Accordingly, the amounts of epoxy ester resin that can be blended with the crosslinker to form coating compositions of the invention may be varied considerably. Preferably, the crosslinking agent is used in amounts of about 5% to about 40% by weight of the total resin solids, more preferably about 20% to about 30%.

C. General Discussion—Other Aspects of the Invention and Other Components

The coating compositions of the invention provide a cured coating having the advantageous physical properties described above, over a wide range of cure temperatures and a wide range of solids levels. More specifically, the coating compositions according to preferred embodiments of the invention cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the good storage stability of the coating composition, it can be readily recognized that the present invention provides a significant advance in the coating composition art.

It will be within the skill of the art to determine the proper volatile organic content for a given coating composition of the invention and for a given application. Preferred solvents have relatively low volatility at temperatures appreciably below their boiling points such that solvent evaporation is low during storage and during application of the coating composition to the substrate. A suitable solvent system may include, for example, toluene, methyl ethyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure. Where the composition is to be formulated as a higher solids content primer composition employing aminoplast crosslinking agent, it generally is preferred to employ a portion of C-1 to C-8 alcohol solvent such as, for example, butanol, pentanol, hexanol, and the like or a mixture of any of them since these inhibit the crosslinking reaction of the polyfunctional aminoplast resin with the epoxy ester resin at room temperature and thereby improve storage stability. At elevated temperature during cure, the alcohol solvent evaporates and, hence, ceases to inhibit the crosslinking reaction. Preferred solvents also include, for example, methyl amyl ketone and the like, or a mixture thereof with C-1 to C-8 alcohol such as, for example, a 1:2 mixture by weight of butanol and methyl amyl ketone, respectively.

Any solvent allowed to remain in the cured coating should be inert so as to avoid adverse effect upon the cured coating or upon another coating layer used in conjunction with it during the curing process or thereafter. Preferably, the cured coating is substantially free of solvent.

Sufficient solvent is used to reduce the viscosity of the coating composition to a level suitable for application to the substrate in the desired manner. It can be applied by any conventional method, including brushing, dipping, flow coating, spraying, etc. Spraying will generally be preferred, for example, for applying the compositions as an automotive primer.

Also preferably included in compositions of the invention employing aminoplast crosslinking agent is any of a variety of acid catalyst known to the skilled of the art to catalyse the aminoplast crosslinking reaction, for example, p-toluenesulfonic acid, phosphoric acid, phenyl acid phosphate, butyl phosphate, butyl maleate, and the like or a compatible mixture of any of them. Such acid catalyst is most useful for coating compositios intended for low temperature curing schedules and/or when highly etherified melamine resins are used such as hexa(methoxymethyl)melamine or the like. Such catalysts are used in amounts which depend, in part, upon the intended baking (curing) schedule. Typically, amounts of about 0.2% to about 3.% are used, more preferably about 0.4% to about 0.6% by weight of total resin solids. In addition to catalyst, flow control agent(s), for example, polybutyl acrylate; wetting agent(s), for example, silicone; pigments; pigment dispersants; corrosion inhibitors, for example, chromate pigments, numerous of all of which are known to the skilled of the art, may be employed in the coating compositions of the invention. In addition, suitable reactive additives can be used, including, for example, low molecular weight diol flow control agents and reactive diluents.

Compositions of the invention, and in particular primers of higher solids content, also may include anti-settling or anti-sagging agents to control the thixotropic properties of the composition. Exemplary of available materials suitable for this purpose are Dislon (trademark) 6900-20X manufactured by Kusumoto Chemicals, Ltd., Tokyo, Japan and sold by King Industries, Norwalk, CT 06852; Bentone (trademark) 38, N. L. Industries, Highstown, N.J.; and Cab-O-Sil (trademark) M-5, Cabot Corporation.

Curing the coating composition requires baking for sufficient time at sufficiently elevated temperature to react the crosslinking agent with the hydroxy functionality of the epoxy ester resin. The time and temperature required to cure the coating are interrelated and depend upon the particular epoxy ester resin, crosslinking agent, solvent and other materials, if any, and the amount of each comprising the coating composition. The coating compositions according to preferred embodiments of the invention, as described above, are found to provide best coating results when cured at temperature at about 300° F. for about 20 minutes. It is a highly significant advantage of the invention, however, that these same coating compositions can withstand, for example, temperature as high as about 200° C. (390° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shutdowns are recovered with cured and unharmed coatings.

Coating compositions according to the present invention, comprising the novel crosslinkable hydroxy functional epoxy ester resin of the invention and blocked polyisocyanate crosslinking agent, especially the preferred materials described above, are found to afford cured coatings with improved corrosion resistance, thus representing a significant advance in the art. A most preferred use of the coating composition of the invention is as a sprayable primer for use on a bare metal substrate such as a household or industrial appliance housing or an automotive vehicle body. Primer compositions typically are pigmented and any pigments commonly included in primer compositions for metal substrates and acrylic dispersion topcoats such as, for example, carbon black, iron oxide, lithopone, magnesium, silicate, silica, barium sulfate, $TiO_2$, chrome yellow, calcium chromate, strontium chromate, zinc potassium chromate any the like may be used. The primer can be pigmented according to known methods including, for example, by grinding pigments in a portion of the curable resin and adding to the primer composition. The pigment-to-binder ratio of the primer may be as much as 4:1 by weight, respectively. It is preferred, however, to use a primer having a pigment-to-binder ratio of about 1:1 to 2:1 by weight, respectively.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a sprayable automotive vehicle primer the solvent will comprise preferably about 25 to about 35 percent by weight of the total coating compositions although, of course, larger or smaller amounts may be utilized depending upon the solids content desired.

The primer is generally thinned to from about 65 to about 70 percent solids content for spraying purposes with conventional thinners such as aromatic hydrocarbons, commercial petroleum cuts which are essentially aromatic, and the like, and sprayed on to the metal base and cured. The primer is cured at elevated temperatures by any convenient means such as baking ovens or banks of infra-red heat lamps. Curing temperatures are preferably from about 135° C. to about 165° C., although curing temperatures from about 100° C. to about 230° C. may be employed, if desired.

The invention will be further understood by referring to the following detailed examples. It should be understood that the specific examples are presented by way of illustration and not by way of limitation. Unless otherwise specified, all references to "parts" are intended to mean parts by weight.

EXAMPLE I

In a suitable reactor are charged 1248 parts of Epon 829 (trademark, Shell Chemical Co., diepoxide) and 530 parts of bisphenol-A. The temperature of the mixture is brought up to 177° C. (350° F.) at which point an exothermic reaction takes place that raises the temperature up to 204° C. (400° F.). The temperature is kept about 350° F. for 30 minutes. The batch is then cooled down to 300° F. and 281 parts at dimethylolpropionic acid, 593 parts of Soya fatty acid and 13.2 parts of lithium neodecanoate are added. The temperature is raised to 350° F. and kept there until the acid number drops below 10. The reaction mixture is cooled down to 149° (300° F.) and 663 parts of methyl amyl ketone are added. The resulting resin has a viscosity of W at 80% non-volatiles content.

EXAMPLES II–V

Hydroxy functional epoxy ester resins according to the invention are prepared in the manner described below. The components employed are shown in Table I. The diepoxide, hydroxy functional acid and diphenol, with catalyst (sodium carbonate), if any, are charged in a suitable reactor. The mixture is heated to about 177° C. (350° F.). At this point, exothermic reaction takes place that brings the temperature up to about 188°–199° C. (370°–390° F.). The reaction is continued at this temperature until the acid number drops below 6. The product is cooled down to about 121° C. (250° F.) and thinned to 80% non-volatiles by weight with methyl amyl ketone. In Table I, all amounts are shown in parts by weight.

TABLE I

|  | Example | | | |
|---|---|---|---|---|
|  | II | III | IV | V |
| Epon 829[1] | 500 | 500 |  |  |
| DER 333[2] |  |  | 500 |  |
| Araldite RD-2[3] |  |  |  | 268 |
| Bisphenol-A | 212 | 212 | 212 | 159 |
| Dimethylol Propionic Acid | 227 | 113 | 227 | 54 |
| Soya Fatty Acid |  | 237 |  |  |
| Sodium Carbonate |  |  |  | 0.5 |
| Methyl Amyl Ketone | 234 | 265 | 234 | 120 |
| % Non-Volatiles | 80.0 | 79.8 | 79.6 | 79.8 |
| Viscosity | $Z_1$ | Z | $Z_1$ | S |
| Acid Number | 0.9 | 1.1 | 0.9 | 0.9 |

[1]Trademark, Shell Chemical Co. (diepoxide; specifically, bisphenol-A epichlorohydrin epoxy resin)
[2]Trademark, Dow Chemical Co. (diepoxide)
[3]Trademark, Ciba-Geigy Corp. (diepoxide)

EXAMPLE VI

A millbase, that is, a composition pigment paste is prepared by grinding in a ballmill the following mixture:

| Composition | Parts |
|---|---|
| Barium Sulfate | 1626 |
| Red Iron Oxide | 60 |
| Titanium dioxide | 105 |
| Silica | 75 |
| Strontium chromate | 99 |
| Polyethylene Wax | 48 |
| Xylene | 200 |
| Toluene | 240 |
| Methyl Ethyl Ketoxime | 57 |
| Resin of Example II | 264 |

EXAMPLES VII–X

Coating Compositions according to the invention are prepared, each being adapted for use as a sprayable, pigmented primer for application over bare, unpolished steel automotive vehicle body panels in an automobile vehicle assembly operation. The coating composition components are shown in Table II, below. Each coating composition was reduced with methyl amyl ketone to about 18–25 sec. #4 Ford Cup, 27° C. (80° F.) to provide a preferred spraying viscosity. It will be noted that use of a drier, as in Examples VII, VIII and IX, is optional, to catalyse reaction of fatty acid double bonds to provide additional crosslinking in the cured resin. In Table II, all amounts are expressed in parts by weight.

TABLE II

|  | Example | | | |
|---|---|---|---|---|
|  | VII | VIII | IX | X |
| Epoxy Ester Resin of Example I | 270 | 270 | 270 | 270 |
| Phenyl acid phosphate | — | 1 | — | — |
| PTSA | — | — | 1 | 1 |
| Millbase of Example VIII | 800 | 800 | 800 | 800 |
| Resimine 717[1] | 110 | 110 | — | — |
| Cymel 325[2] | — | — | 110 | — |
| Cymel 303[3] | — | — | — | 93 |
| 6% Manganese Naphthanate | 4 | 4 | 4 | — |

TABLE II-continued

|  | Example | | | |
|---|---|---|---|---|
|  | VII | VIII | IX | X |
| (Drier) |  |  |  |  |
| Butanol | 35 | 35 | 35 | — |

[1]Trademark, Monsanto Co., St. Louis, MO (low temperature, high solids methylated melamine-formaldehyde resin crosslinking agent).
[2]Trademark, American Cyanamid, Wayne, New Jersey, (highly methylated melamine formaldehyde resin).
[3]Trademark, American Cyanamid, Wayne, New Jersey, (hexa(methoxymethyl)-melamine).

EXAMPLES XI–XIV

Additional coating compositions according to the invention, each adapted for use as a sprayable pigmented primer for application over, for example, bare, unpolished steel automotive vehicle body panels in an automotive vehicle assembly operation, are prepared as shown in Table III. below. It should be noted that use of a drier, as in the coating compositions illustrated in Table III, is optional. The epoxy ester resin employed in each coating composition is identified by reference to the Example according to which it is prepared. All amounts are expressed in parts by weight.

TABLE III

|  | Example | | | |
|---|---|---|---|---|
|  | XI Exp.II | XII Exp.III | XIII Exp.IV | XIV Exp.V |
| Epoxy Ester Resin | 270 | 270 | 270 | 270 |
| Phenyl acid phosphate | 1 | 1 | 1 | 1 |
| Millbase of Exp. VI | 800 | 800 | 800 | 800 |
| Resimine 717[1] | 110 | 110 | 110 | 110 |
| 6% Manganese Naphthanate (Drier) | 4 | 4 | 4 | 4 |
| Butanol | 35 | 35 | 35 | 35 |
| Polybutyl acrylate | 3 | 3 | 3 | 3 |
| Butyl Cellosolve Acetate[2] | 15 | 15 | 15 | 15 |

[1]Trademark, Monsanto Co., St. Louis, MO (low temperature, high solids methylate melamine-formaldehyde resin crosslinking agent).
[2]Trademark, Union Carbide Corporation, New York, New York (ethylene glycol monobutyl ether acetate).

EXAMPLE XV

A blocked isocyanate crosslinker useful in compositions of the invention is prepared. In a suitable reactor, 417 parts of PAPI 580 (trademark, The Upjohn Company Kalamazoo, Mich. are charged under a nitrogen blanket. 261 parts of methyl amyl ketoxime are added dropwise in a period of 30 minutes keeping the temperature below 210° F. by external cooling. After the addition is completed the temperature is maintained at 210° F. for an additional hour at which time the complete reaction of the isocyanate is verified by I.R. The batch is then thinned with 226 parts of methyl amyl ketone. The resulting resin has a viscosity of $Z_{6+}$ at 75% solids.

EXAMPLES XVI–XIX

Blocked isocyanate crosslinking agents useful in compositions of the invention are prepared in the manner generally described in Example XV from the components shown in Table IV.

TABLE IV

|  | Example | | | |
|---|---|---|---|---|
|  | XVI | XVII | XVIII | XIX |
| Dezmodur L-2291A[1] | 360 | 360 |  |  |
| PAPI - 27[2] |  |  | 399 |  |
| Dezmodur IL[3] |  |  |  | 525 |

TABLE IV-continued

| | Example | | | |
|---|---|---|---|---|
| | XVI | XVII | XVIII | XIX |
| Methyl amyl ketoxime | 174 | | 261 | 87 |
| Benzotriazole | | 238 | | |
| Methyl amyl ketone | 133 | 150 | 220 | |
| % Non-Volatiles | 80.0 | 80.1 | 75.1 | 57 |
| Viscosity | $Z_{1\frac{1}{2}}$ | $Z_7$ | $Z_2$ | Z |

[1]Trademark, Mobay Chemical Corporation, Pittsburgh, Pennsylvania
[2]Trademark, The Upjohn Company, Kalamazoo, Michigan
[3]Trademark, Mobay Chemical Corporation, Pittsburgh, Pennsylvania

EXAMPLES XXX-XXIV

Coating compositions according to the invention are prepared, each being adapted for use as a high solids, sprayable, pigmented primer for application over bare, unpolished steel automotive vehicle body panels in an automotive vehicle assembly operation. The coating composition components are shown in Table V below. Each coating composition is reduced with methyl amyl ketone to about 18-25 sec. #4 Ford Cup, 27° (80° F.) to provide a preferred spraying viscosity. It will be noted that use of a drier is optional, to catalyse reaction of fatty acid double bonds to provide additional crosslinking in the cured resin. In Table V, all amounts are expressed in parts by weight.

TABLE V

| | Example | | | | |
|---|---|---|---|---|---|
| Composition | XX | XXI | XXII | XXIII | XXIV |
| Epoxy Ester Resin of Example I | 270 | 270 | 270 | 270 | 270 |
| Millbase of Example VI | 800 | 800 | 800 | 800 | 800 |
| Cross-linker of Example XV | 125 | | | | |
| Cross-linker of Example XVI | | 115 | | | |
| Cross-linker of Example XVII | | | 115 | | |
| Cross-linker of Example XVIII | | | | 125 | |
| Cross-linker of Example XIX | | | | | 162 |
| 6% Manganese Naphthanate (drier) | 4 | | | | |
| dibutyl tin dilaurate | 1 | 1 | 1 | 1 | |
| N—methyl pyrolidone | 20 | 20 | 20 | 20 | 20 |

In view of the foregoing disclosure, many modifications of this invention will be apparent to those skilled in the art. All such apparent modifications fall within the scope of this invention and are intended to be included within the terms of the appended claims.

Industrial Applicability

It will be apparent from the foregoing that this invention has industrial applicability as a coating composition, especially as a coating composition for automotive vehicles, household appliances and the like, and other applications where excellent humidity and solvent resistance are needed to provide protection for a substrate, for example a metal substrate, against corrosion, wear and the like.

What is claimed is:

1. An organic solvent based thermosetting composition comprising:
(A) crosslinkable hydroxy functional epoxy ester resin having a number average molecular weight (Mn) between about 1,000 and about 5,000, said resin comprising the reaction product of diepoxide chain extended with diphenol and chain terminated with acid component comprising hydroxy functional acid; and
(B) polyfunctional, hydroxy-reactive crosslinking agent selected from aminoplast crosslinking agent, blocked polyisocyanate crosslinking agent comprising at least two isocyanate groups blocked by reaction with an active hydrogen bearing blocking agent, and a compatible mixture of any of them, said crosslinking agent being included in an amount such that at the cure temperature of the composition said crosslinking agent will provide between about 0.5 and about 1.6 hydroxy reactive groups per hydroxy group contributed by said epoxy ester resin.

2. The solvent based, thermosetting composition in accordance with claim 1, wherein said hydroxy functional epoxy ester resin comprises the reaction product of said acid component with diepoxide previously chain extended with diphenol.

3. The solvent based, thermosetting composition in accordance with claim 1, wherein said hydroxy functional epoxy ester resin comprises the reaction product of diepoxide substantially simultaneously with diphenol and said acid component.

4. A solvent based, thermosetting composition in accordance with claim 1, wherein said diepoxide is selected from the group consisting of bisphenol-A epichlorohydrin epoxy resin, hydantoin epoxy resin, cyclic and acyclic aliphatic diepoxides, and a compatible mixture of any of them.

5. A solvent based thermosetting composition in accordance with claim 1, wherein said diphenol reactant has the general formula:

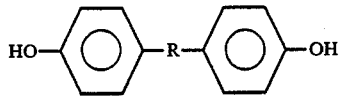

wherein R is a divalent, organic, linking moiety substantially unreactive with said diepoxide and with said acid component.

6. A solvent based thermosetting composition in accordance with claim 5, wherein said diphenol reactant is selected from the group consisting of bisphenol-A, bisphenol-B and a compatible mixture thereof.

7. The solvent based thermosetting composition of claim 1, wherein said hydroxy functional acid is selected from $C_3$-$C_{26}$ acids bearing a single carboxyl group, at least one primary hydroxyl group, and no additional functionality which would react substantially with said chain extension reactants or the reaction product thereof.

8. The solvent based thermosetting composition of claim 1, wherein said hydroxy functional acid is selected from those of the general formula:

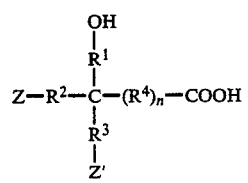

wherein n is 0 to 20; $R_1$, $R_2$, $R_3$, and $R_4$ are the same or different and each is $C_1$-$C_4$ alkylene; and Z and Z' are selected independently from H, OH, nitrile ester, halogen and amide.

9. The solvent based thermosetting composition of claim 8, wherein at least one of Z and Z' bears an hydroxyl group.

10. The solvent based thermosetting composition of claim 1, wherein said hydroxy functional acid is selected from the group consisting of dimethylolpropionic acid, bis(hydroxy ethyl)propionic acid, bis(hydroxy propyl)propionic acid, and a compatible mixture of any of them.

11. The solvent based thermosetting composition of claim 1, wherein said acid component further comprises fatty acid, said hydroxy functional acid and said fatty acid being in molar ratio of from 1:0 to about 1:1.

12. The solvent based thermosetting composition of claim 11, wherein said fatty acid is selected from the group consisting of Soya fatty acid, butyric, lauric, palmitic and stearic fatty acid and a compatible mixture of any of them.

13. A solvent based, thermosetting composition in accordance with claim 1, wherein said crosslinking agent consists essentially of blocked polyisocyanate.

14. A solvent based, thermosetting composition in accordance with claim 13, wherein said blocked polyisocyanate is selected from blocked aliphatic, aromatic, cycloalkylene, aliphatic aromatic and nuclear substituted aromatic polyisocyanates.

15. A solvent based, thermosetting composition in accordance with claim 1, wherein said blocked polyisocyanate crosslinking agent comprises blocked polymethylene polyphenol isocyanate which prior to blocking has the formula:

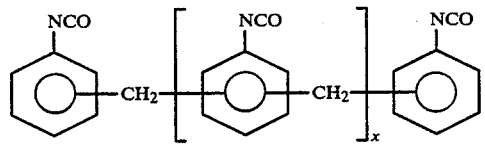

wherein x equals 1 to 3.

16. A solvent based, thermosetting composition in accordance with claim 1, wherein blocked polyisocyanate crosslinking agent is employed which comprises the reaction product of an active hydrogen-bearing blocking agent with polyisocyanate comprising isocyanurate ring-bearing polyisocyanate prepared by cyclotrimerization of diisocyanate.

17. A solvent based, thermosetting composition in accordance with claim 16, wherein said blocked polyisocyanate crosslinking agent consists essentially of blocked trifunctional isocyanurate represented by the formula:

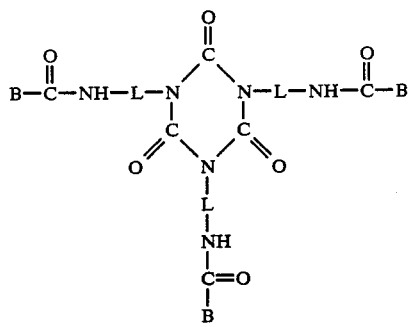

wherein each L is selected independently from the group consisting of aliphatic, cycloaliphatic and aromatic divalent radicals and B is the residue of said active hydrogen bearing blocking agent.

18. A solvent based, thermosetting composition in accordance with claim 1, wherein said polyisocyanate employed in the preparation of said blocked polyisocyanate crosslinking agent comprises an isocyanate terminated prepolymer prepared by reacting polyol with an excess of polyisocyanate.

19. A solvent based, thermosetting composition in accordance with claim 1, wherein said crosslinking agent consists of blocked polyisocyanate prepared by
(A) reacting (i) organic diisocyanate represented by the formula

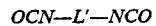

wherein L' is selected from the group consisting of aliphatic, cycloaliphatic and aromatic radicals and combinations thereof and wherein one of the isocyanate groups thereof is substantially more reactive than the other, and (ii) sufficient active hydrogen bearing blocking agent to react with substantially all of said more reactive isocyanate groups; and
(B) reacting the reaction product of (A) with sufficient polyol to react with the remaining isocyanate groups.

20. A solvent based, thermosetting composition in accordance with claim 19, wherein said polyol is selected from oligoester diols and triols which (i) have a number average molecular weight (Mn) between about 150 and about 3,000 and (ii) are the product of esterification reaction between carboxylic acid reactant and epoxide reactant, said esterification reaction product being selected from the group consisting of the esterification reaction product of:
(a) polycarboxylic acid and monoepoxide;
(b) polyepoxide and monocarboxylic acid containing no ethylenical unsaturation and bearing no hydroxy functionality;
(c) hydroxy functional carboxylic acid and monoepoxide;
(d) monocarboxylic acid and hydroxy functional monoepoxide; and
(e) mixtures of (a)-(d).

21. The solvent based, thermosetting composition of claim 1, wherein said crosslinking agent consists of hexa(methoxymethyl)melamine.

22. An organic solvent based, thermosetting composition comprising:
(A) crosslinkable hydroxy functional epoxy ester resin having a number average molecular weight (Mn) between about 1,000 and about 5,000, said resin comprising the reaction product of diepoxide reactant selected from the group consisting of bisphenol-A epichlorohydrin epoxy resin, hydantoin epoxy resin, cyclic and acyclic aliphatic diepoxide and a compatible mixture of any of them, with (i) diphenol reactant selected from the group consisting of Bisphenol-A, Bisphenol-B and a mixture thereof, and (ii) primary hydroxy functional organic acid selected from the group consisting of dimethylolpropionic acid, bis(hydroxy ethyl)propionic acid, bis(hydroxy propyl)propionic acid and a compatible mixture of any of them; and (B) blocked polyisocyanate crosslinking agent comprising at least two isocyanate groups which have been blocked by reaction with an active hydrogen bearing blocking agent, said blocked polyisocyanate being selected from blocked aliphatic, aromatic, cycloalkylene, aliphatic aromatic, and nuclear substituted aromatic polyisocyanates and being included in said composition in an amount such that upon de-blocking of the blocked isocyanate groups thereof at the cure temperature of the composition, said crosslinking agent will provide between about 0.5 and about 1.6 reactive isocyanate groups per reactive hydroxy group of said epoxy ester resin.

* * * * *